US011394801B2

(12) United States Patent
Raman

(10) Patent No.: US 11,394,801 B2
(45) Date of Patent: Jul. 19, 2022

(54) RESILIENCY CONTROL ENGINE FOR NETWORK SERVICE MESH SYSTEMS

(71) Applicant: Bank of America Corporation, Charlotte, NC (US)

(72) Inventor: Sundarrajan Raman, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 148 days.

(21) Appl. No.: 16/748,145

(22) Filed: Jan. 21, 2020

(65) Prior Publication Data

US 2021/0227048 A1    Jul. 22, 2021

(51) Int. Cl.
| | |
|---|---|
| *H04L 67/61* | (2022.01) |
| *H04L 67/01* | (2022.01) |
| *G06N 20/00* | (2019.01) |
| *G06F 9/445* | (2018.01) |
| *G06F 9/455* | (2018.01) |

(52) U.S. Cl.
CPC ............ *H04L 67/322* (2013.01); *G06F 9/445* (2013.01); *G06N 20/00* (2019.01); *H04L 67/42* (2013.01); *G06F 9/45533* (2013.01)

(58) Field of Classification Search
CPC ....... H04L 67/322; H04L 67/42; G06N 20/00; G06F 9/445; G06F 9/45533
See application file for complete search history.

(56) References Cited

U.S. PATENT DOCUMENTS

| | | | |
|---|---|---|---|
| 7,058,706 B1 | 6/2006 | Iyer et al. | |
| 7,454,458 B2 | 11/2008 | Islam et al. | |
| 8,850,034 B1* | 9/2014 | Amancherla | ....... H04L 67/1034 709/227 |
| 8,977,677 B2 | 3/2015 | Salamatov et al. | |
| 8,996,699 B2 | 3/2015 | Jenkins et al. | |
| 9,647,957 B2* | 5/2017 | Salamatov | .............. H04L 67/10 |
| 9,967,232 B1 | 5/2018 | Royt et al. | |
| 10,097,616 B2 | 10/2018 | Walker et al. | |
| 10,169,094 B2 | 1/2019 | Iyer | |
| 10,732,873 B1* | 8/2020 | Lee | ...................... G06F 11/3428 |
| 2005/0198285 A1* | 9/2005 | Petit | ........................ H04L 67/42 709/225 |
| 2012/0072570 A1* | 3/2012 | Jenkins | ................ H04L 43/0852 709/224 |

\* cited by examiner

*Primary Examiner* — Glenton B Burgess
*Assistant Examiner* — Patrick F Ngankam
(74) *Attorney, Agent, or Firm* — Banner & Witcoff, Ltd.

(57) ABSTRACT

A resiliency controller may monitor execution of a plurality of services, each service of the plurality of services associated with a different container of a containerized computing system. In response to requests received from a plurality of connected client computing systems, the resiliency controller predicts, based on historical container operation information, a first predicted latency associated with the first request and a second predicted latency associated with the second request. The resiliency controller associates a first latency response to the first request and a second latency response to the second request, and initiates a selected latency response based on an indication that at least one of the first predicted latency or the second predicted latency has been exceeded.

19 Claims, 7 Drawing Sheets

| Input Parameters/ Latency Action | API Request Priority Header | Latency Reason Indicator | API High Availability Ranking | API SLA | Exception Reason | Pod Health Indicator | Container CPU Usage Indicator | Container Resource Allocated | Latency Response Action |
|---|---|---|---|---|---|---|---|---|---|
| App-1-Req-1 | 3 | Slowness | 2 | 2s | Database Unavailable | 0.5 | 0.7 | High | Retry |
| App-2-Req-2 | 2 | Service Failure | 1 | 3s | Too Many Requests | 0.2 | 0.8 | Medium | Timeout |
| App-3-Req-3 | 2 | Service Failure | 2 | 4s | App Server Down | 0.3 | 0.9 | Low | Circuit Breaking |
| App-1-Req-4 | 4 | Unavailability | 3 | 7s | File Not Found Error | 0.2 | 0.3 | Hg Medium | Eject Pod |
| App-2-Req-5 | 5 | Unavailability | 4 | 10s | Application Error | 0.3 | 0.3 | Low | Re-Routing |
| App-3-Req-5 | 2 | Service Failure | 5 | 3s | Application Error | 0.2 | 0.2 | High | Re-Start a Pod |
| App-1-Req-6 | 1 | Unavailability | 5 | 2s | Application Scalability Error | 0.8 | 0.8 | Medium | Scale App (Add Pod) |

FIG. 5

RESILIENCY CONTROL ENGINE FOR NETWORK SERVICE MESH SYSTEMS

BACKGROUND

Business organizations, educational institutions, government entities, and the like may provide computing services to consumers via a distributed computing network. In many cases, the computing resources may be distributed over different computing centers and may be configured to provide computing services to different users, such as via one or more computing networks, such as the Internet, a wide area network (WAN), a telecommunications network, a local area network (LAN), a cable network, and/or the like. In some cases, these computing systems may include distributed computing centers, providing data center services, cloud computing services, application services and each location may include large numbers of computing resources, such as servers, data repositories, web servers, and the like that may be used to provide the products and/or services to the consumer. In many cases, the computing resources may be configured with different hardware and/or hardware versions, firmware and/or firmware versions, software and/or software versions, such that an application developed at a first geographical location on a computer system having a first configuration may not properly run a second computing system at a different geographical location due to differences in the hardware, firmware and software at the different locations.

In many cases, enterprise computing networks may provide networked services as a client-server based computing system. In such systems, multiple client devices may communicate their requests via a network to one or more servers, where a volume of traffic or other reason may lead to unpredictable issues, particularly for high priority messages. Today, computing systems may provide a static response to unpredictable server behavior. Improving the resiliency of such systems is costly, particularly in terms of computing power, if such resiliency is even possible. In some cases, container platforms implementing service mesh systems may be used. However, such systems may be very static in nature so that modifying the latency response involves excessive configuration time and/or computing deployment changes. In some cases, microservices may be used and may process functions from multiple application programming interfaces (APIs). In some cases, microservices processing a request-response pipeline may not be capable of dynamically deciding a resiliency control action with respect to particular request along with its associated request priority.

As such, a need has been recognized for a computing system to provide a high level of resiliency for such applications.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for providing dynamic latency responses based on latency conditions during operation of a containerized computing system. A resiliency controller may monitor execution of a plurality of services, each service of the plurality of services associated with a different container of a containerized computing system. In response to requests received from a plurality of connected client computing systems, the resiliency controller predicts, based on historical container operation information, a first predicted latency associated with the first request and a second predicted latency associated with the second request. The resiliency controller associates a first latency response to the first request and a second latency response to the second request, and initiates a selected latency response based on an indication that at least one of the first predicted latency or the second predicted latency has been exceeded.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 5 shows an illustrative latency control matrix according to one or more aspects of the disclosure;

DETAILED DESCRIPTION

Figure 1:
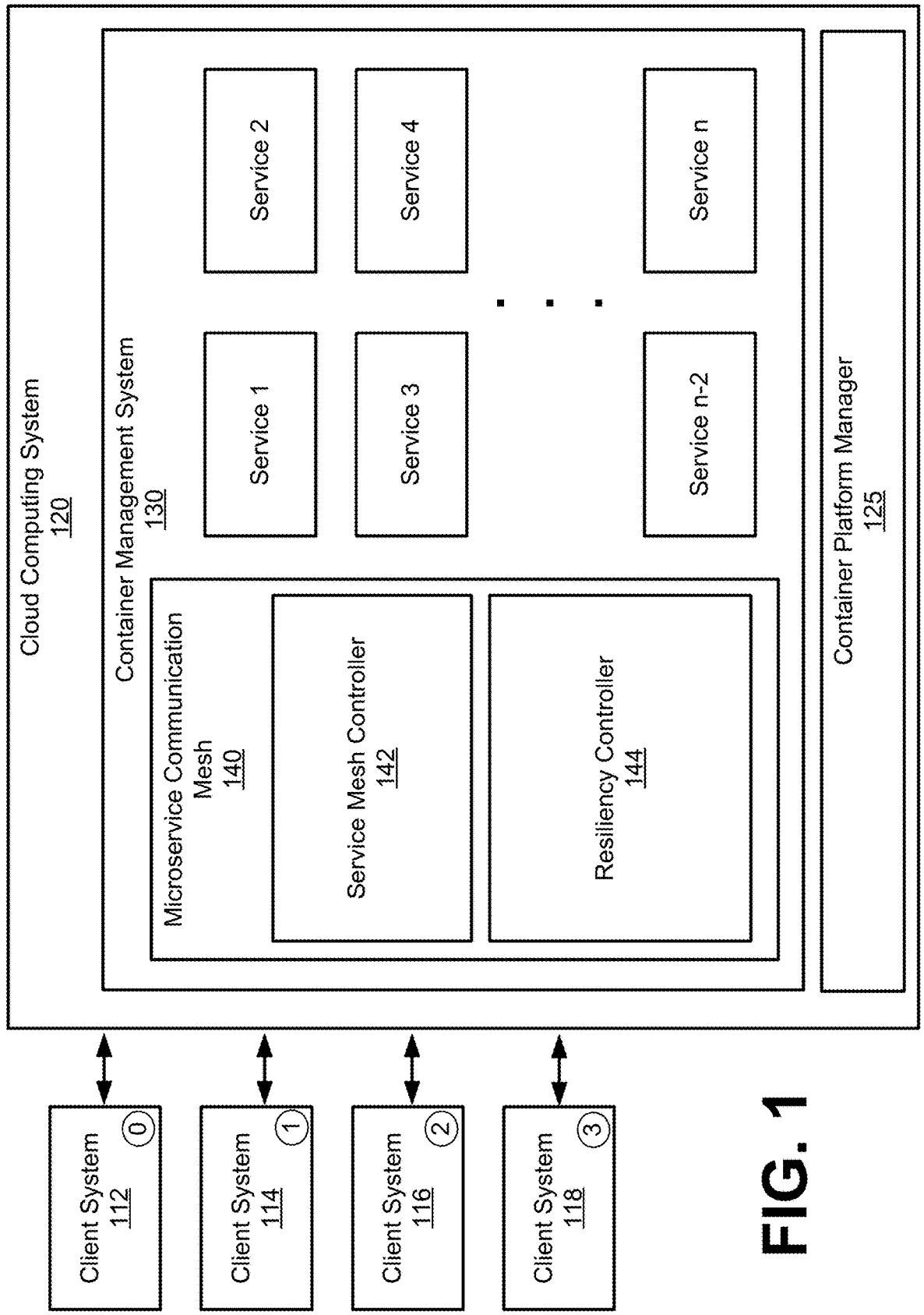
FIG. 1 shows an illustrative cloud computing based container management computing system according to one or more aspects of the disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

For client-server based systems, such as where the client sends a request and the server provides a response, system resiliency from any number unpredictable issues is a high priority. However, current system response is static with respect to unpredictable server behavior. As such, robust system with high system available are nearly impossible to achieve and would be very costly in terms of hardware, software, and manpower support. In an illustrative example, enterprises rely on container platforms with server mesh systems, but these systems are static in nature and modifying responses, such as to unexpected latency issues, involves deployment changes and time. In systems utilizing microservices with multiple application programming interfaces (APIs), request response pipelines are unable to dynamically adjust resiliency controls for each request, particularly with respect to request priorities.

To solve the above noted problems, intelligent and dynamic resiliency mechanisms have been developed and are capable of predicting latency behaviors of the system and to dynamically adjust responses to unexpected resiliency issues based on an automatic choice of a resiliency response to be performed by the system. This resiliency control is highly applicable in commercially available containerized cloud computing environments to improve their native system response. In some cases, machine learning (ML) latency prediction is performed by injecting one or more chaos engineering principles. As such, the ML-based resiliency control mechanism may be able to respond to resiliency issues with a dynamic resiliency feature selection capability. In some cases, the resiliency controller may leverage a new header attribute in a request message, by adding a new parameter (e.g., "request_priority") to evaluate and/or track an importance associated with individual requests and/or to facilitate mapping of each request into an output matrix. This new header parameter may act as a core decider to facilitate choosing of the latency response control value.

Here, unique artificial intelligence (AI) based latency control systems can intelligently identify a reason causing an experienced latency issue and may use that information as feedback when selecting a response, as well as when improving the response. For example, the resiliency controller may use historical information and current system information to predict the latency behavior of the system and automatically and dynamically choose the resiliency response that needs to be exhibited by the server system.

In general, containerized computing systems may be used to minimize potential problems that may be encountered in a computing environment, such as when moving software applications from one computing environment to another. In this illustrative example, software may run differently between a development computing environment, a testing computing environment, a staging computing environment to a production computing environment. In another example, software applications may run differently when moved from a physical machine in a data center to a virtual machine in a cloud computing environment. In such movements, problems may be encountered due to different versioning of software libraries, code interpreters, network topology, security policies, data storage configurations, and the like. Due to such issues, containerized computing environments have gained popularity because each container may be configured to include an entire runtime environment, including an application with all applicable dependencies, libraries, and configuration files needed to run it, in a single package. In doing so, such containerization of application platforms with all applicable dependencies minimize system differences such as operating system (OS) distribution differences, underlying infrastructure differences, and the like.

In many cases, containerized computing systems may be configured by using a distributed application that includes everything necessary to run. Containers provided are operating system and/or hardware independent, and may be deployed based on images, which can be pulled from numerous repositories. In some cases, container orchestration systems may be open-source or proprietary in nature. Also, container orchestration systems may be portable, extensible, may allow for container deployment as a scalable cluster, and may be used, at least in part, to automate the orchestration of containerized applications. Such container orchestration systems may be capable of turning a container into a massively scaled service that may be deployed, updated, scaled automatically.

Cloud-native applications are used by organizations due to their robustness and scalability, where container architecture lends itself to agile development. Containers and microservices have fundamentally changed how organizations develop, ship, and run applications, providing faster, more cost-effective approaches to developing applications in the cloud. In some cases, commercially available container platforms may allow for continuous, high-velocity innovation, where developers may build and share any application and operators may securely run them anywhere. Container platforms may also be capable of orchestrating applications across multi-tenant operating systems. Such container platforms may enable deployment of highly available workloads to automate many of the tasks that orchestration requires, like provisioning pods, containers, and cluster resources. Self-healing components ensure that Docker Enterprise clusters remain highly available. However, currently available container management systems are not capable of resilient and dynamic response to latency issues encountered in such systems.

In current container management systems, a client may send a request to a server, where the server responds to the request. Under normal operations, such request-response actions occur without issue. However, in some cases, when problems are encountered (e.g., a problem connecting with a database) a server response may take longer than expected. IN such scenarios, the server may respond in multiple ways, such as by waiting for an action to complete, issuing a timeout error, performing a short circuit of the server so that no requests can further take place, and the like. However, in current systems, such server responses are statically configured, so that the server will always respond in the configured manner, regardless of outside conditions (e.g., a request priority). In an illustrative case, a client portal may include multiple sections to the portal. Each section of the portal may connect to various applications, where different servers may be responsible for providing different data. In an illustrative example with five servers, servers 1 and 2 provide critical information, servers 3 and 4 provide medium level information, and the information provided by server 5 is lower priority information. If a server configuration causes a response to cross another server's timeout window, problems may occur. For example, if a problem is encountered with server 5, other server operation may be effected. As such, current systems may allow less important requests to interrupt or otherwise impact system performance. As such, dynamic response to server latency issues was an issue to be addressed.

A problem to be overcome is how to make such systems dynamic. In the simple example above, the system included 5 servers. However, real-world applications are often cloud-based, where thousands of microsystems may handle communications with hundreds of components. For example, a single page may load from hundreds of different applications in the cloud-based environment. As such, a problem with a single server may have an unexpected impact on other servers in the system. By making an intelligent server mesh, a dynamic reaction to such problems can be enabled. For example, such intelligent systems may be capable of identifying an underlying reason for a latency issue and may be capable of predicting a list of causes for the latency issue, such that a server may be dynamically configured to overcome the problem as it occurs or before the problem is encountered. For example, in throttling situations more resources may be added to share the load. Here, the resilient system may look at all possible known causes for latency issues and can predict the possible results.

Figure 2:
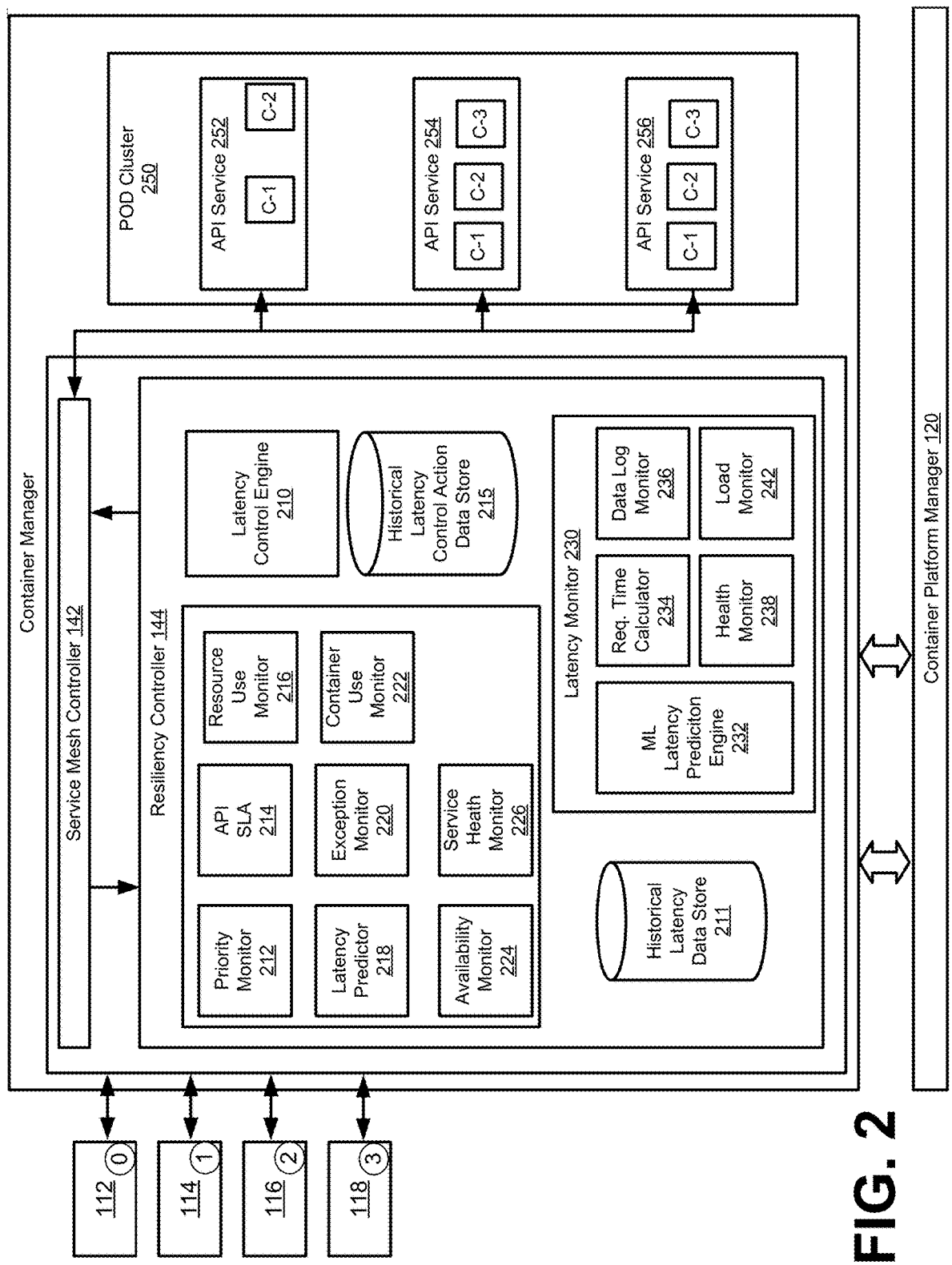
FIG. 2 shows an illustrative cloud computing based container management computing system according to one or more aspects of the disclosure.

FIGS. 1 and 2 show an illustrative cloud computing based container management computing system according to one or more aspects of the disclosure. Here, FIG. 1 shows a higher level view of the illustrative cloud computing based container management computing system 100 and FIG. 2 shows the illustrative cloud computing based container management computing system 200 with additional details shown.

In some cases, the illustrative cloud computing based container management computing system 100 may include a plurality of client computing systems (e.g., client computing system 112, client computing system 114, client computing system 116, client computing system 118, and the like) communicatively coupled to the cloud computing system 120. The cloud computing system 120 may include a container management system 130 and a container platform manager 125. The container management system 130 may further include a microservice communication mesh 140, a service mesh controller 142, a resiliency controller 14 and a plurality of services (e.g., service 1, service n–1, service n, and the like).

In the cloud computing based container management computing system 100, each client computing system may be assigned a priority. For example, client computing system 112 has been assigned a highest priority level of 0, client computing system 114 has been assigned a priority level of 1, client computing system 116 has been assigned a priority level of 2, and client computing system 118 has been assigned a lowest priority level of 3. Here, the priority levels correspond to a system importance associated with requests from the various client computing systems. When the client system sends a request via an API function call, the service mesh controller 142 handles the request and sends the request to the appropriate application or service. If an issue is encountered with respect to the response, the service mesh controller 142 handles any latency issue via a programmed response. Here, the resiliency controller may analyze the request using a prediction engine to predict one or more possible causes of a possible latency issue based on historical and current information. For example, the resiliency controller 144 may collect information from the cloud computing system components, such as server load information, network status information, service processing information, client communication information (e.g., which clients communicates to which services) and the like to identify possible causes to potential problems. Here, the resiliency controller may calculate and/or identify a typical response and/or response times for particular requests or request types as received from the client computing systems 112, 114, 116, and 118. The resiliency controller may connect to components of the cloud computing system 120, such as the container management system 130, and/or the container platform manager 125 to collect container status information, such as pod health information, processor use information, memory use information, and the like. The resiliency controller 144 may then process the historical information (e.g., previously gathered information, data log information, and the like) and/or current information (e.g., current system status information, time of day information, day of week information, application load information, network load information, network traffic information, and the like).

The resiliency controller 144 may analyze the gathered information and, based on a machine learning algorithm (e.g., a Bayesian algorithm, a linear regression algorithm, a logistic regression algorithm, a decision tree, and the like) to predict possible causes of latency problems encountered in the system. This prediction may then be used as an input to a latency control algorithm, along with other input parameters, such as client priority, availability raking parameter, and the like. For example, if a client priority is set to maximum priority (e.g., priority level 0), the resiliency controller 144 may initiate creation of a new pod to allow the service to return a response to the client request to provide data back to the client. If the data was not as important, a timeout response may be deemed the correct response. In doing so, the resiliency controller is capable of deciding an action in response to a latency condition, for example a control action may be a retry of the same request, a timeout response, a circuit breaker response, a pod creation response, use of a different system, and/or a restart response to allow for high availability of certain services. As such, the resiliency controller 144 may provide a dynamic latency action that is intelligent enough to identify a latency cause, decide a control action to be taken, and configure the service mesh controller to perform the control action.

In FIG. 2, the resiliency controller 144 may include a latency control engine 210, aa historical latency data store 211, a historical latency control action data store 215, a priority monitor 212, an API SLA 214, a resource user monitor 216, a latency predictor 218, an exception monitor 220, a container use monitor 222, an availability monitor 224, a service health monitor 226, and a latency monitor 230. The latency monitor 230 may include a machine learning latency prediction engine 232, a request time calculator 234, a data log monitor 236, a health monitor 238, and a load monitor 242. The container management system may further include a pod cluster 250 comprising a plurality of API services 252, 254, and 256.

In some cases, the latency monitor may analyze system information corresponding to time associated with the request-response timeline. For example, the ML latency prediction engine 232 may utilize one or more machine learning algorithms to predict possible causes of latency issues with respect to the computing system and/or network communications. For example, the request time calculator 234 may identify a time associated with particular requests or request types, a time associated with responses to request based on priorities associated with the requests, and the like. The data log monitor 236 may access data logs associated with computing components and/or networking components to collect network and/or service device operation information. The request time calculator 234 may monitor requests and identify a time associated with each request and/or type of request to identify an average time, a shortest time, a longest time associated with a request-response cycle to identify typical duration of a request-response cycle based on a client system, a priority, a time of day, a day of week, and the like. The load monitor 242 may monitor and/or gather network and/or server load information, the health monitor 238 may monitor data logs and/or other status information associated with server health. Each of the request time calculator 234, the data log monitor 236, the health monitor 238, and the load monitor 242 may store information in the historical latency data store 211 and/or may provide information to the ML latency prediction engine 232. The ML latency prediction engine 232 may analyze current data and/or historical latency information to predict an expected latency for each request received, based on a request type, time of day, request priority, network traffic, system loading information and the like. The resulting prediction may be provided to the latency control engine 210 for use in identifying a control action to be taken with respect to certain latency situations.

Similarly, the priority monitor 212, the API SLA 214, the resource use monitor 216, the exception monitor 220, the container use monitor 222, the availability monitor 224, the service health monitor 226 may monitor the container system to monitor expected times associated with priorities, API function calls, resource loading situations, exception handling responses, container use and/or loading information, system availability situations, and/or service health situations. Such information may be analyzed by the latency predictor and/or the latency control engine 210, along with historical latency control action information from the historical latency control action data store 215, to generate a latency control action to be assigned to particular requests, request types, request sources, and/or request priorities. In some cases, the resiliency control 144 may use a regressor algorithm to compute the latency control action, such as by performing a weighted combination of each input.

Figure 3:
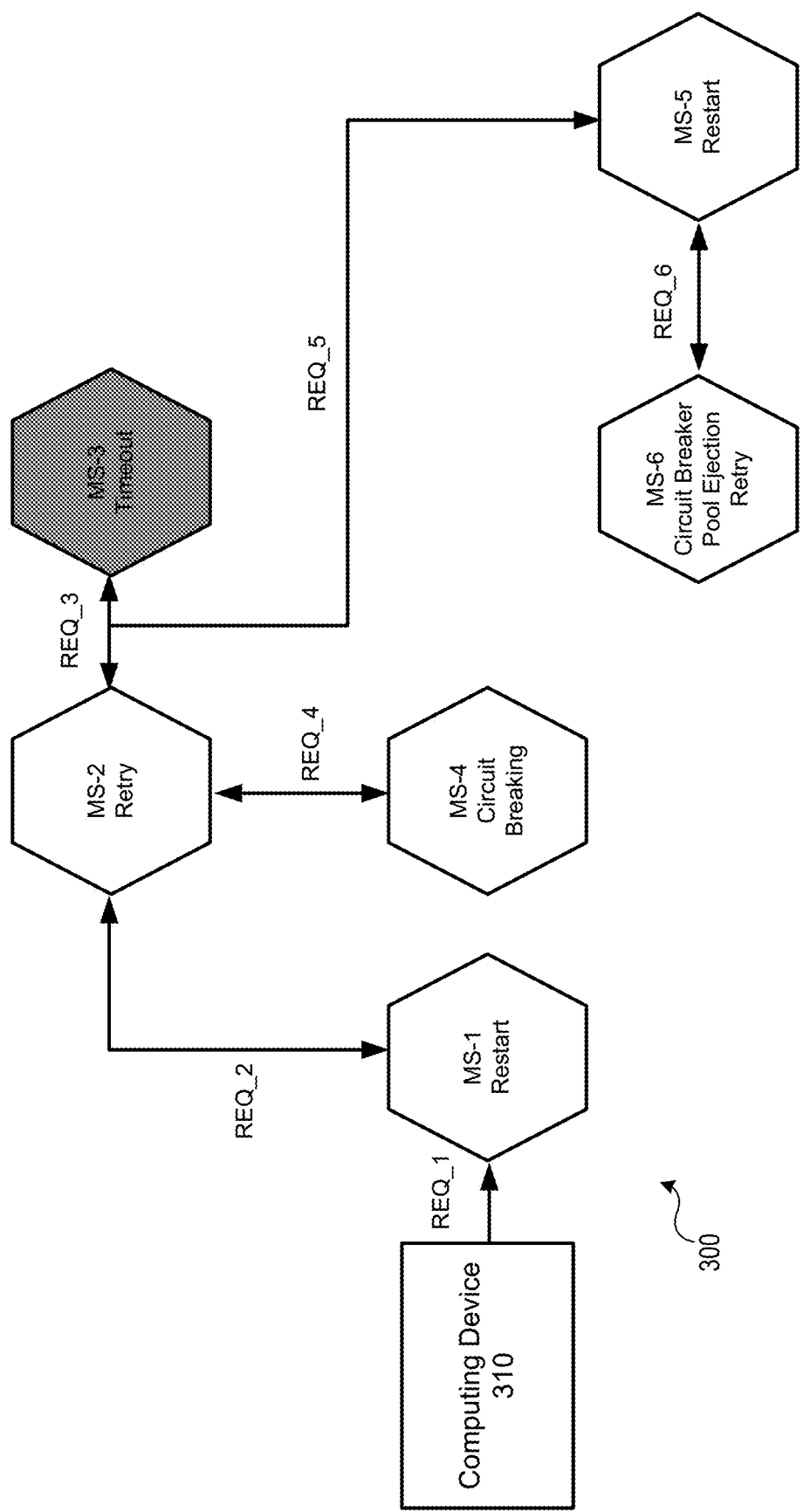
FIG. 3 shows an illustrative request message scenario according to one or more aspects of the disclosure.
Figure 4:
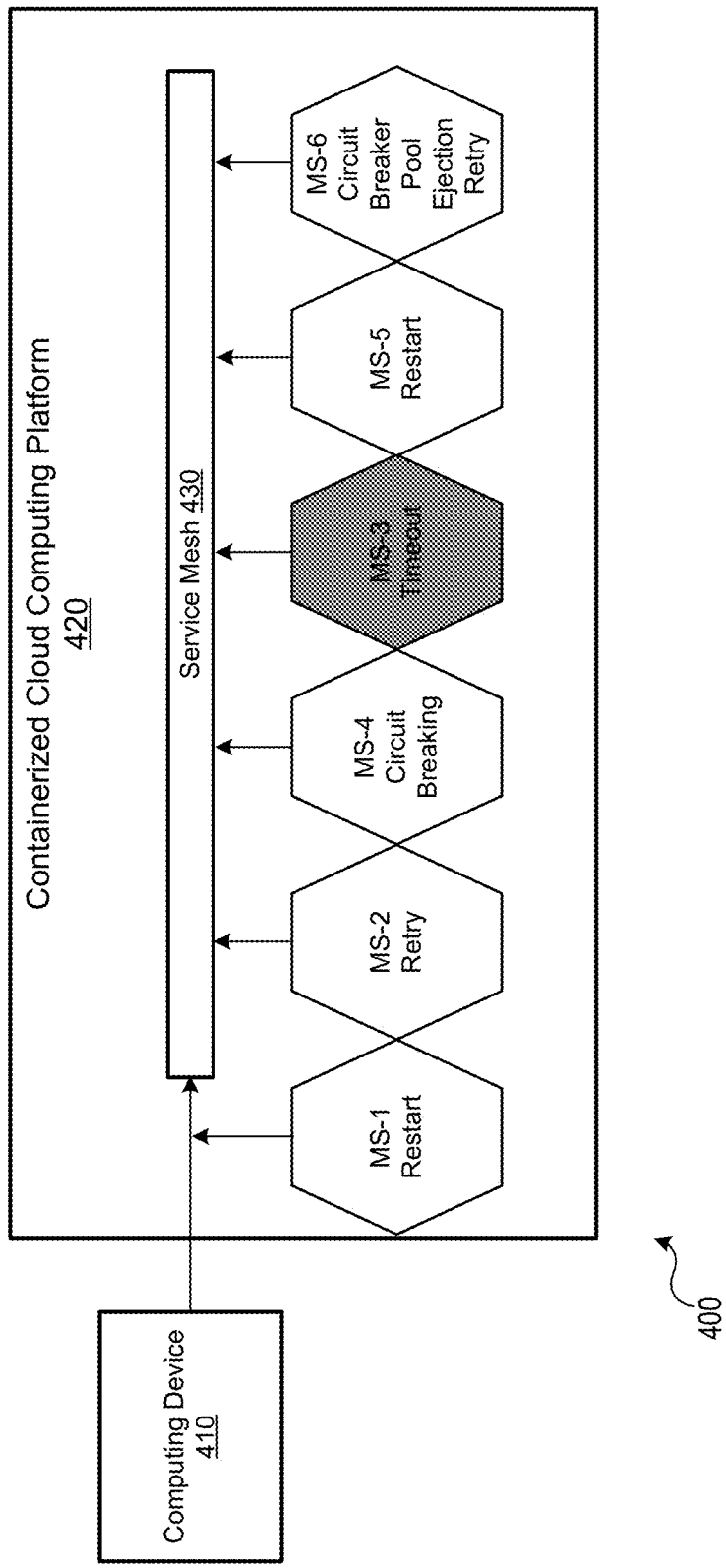
FIG. 4 shows an illustrative request message scenario according to one or more aspects of the disclosure.

FIG. 3 shows an illustrative request message scenario 300 and FIG. 4 shows another illustrative request message scenario according to one or more aspects of the disclosure. The message scenario 300 correspond to a current request-response scenario in current systems. From computing device 310, a first request (REQ_1) is received to service MS-1, which is configured to restart. A second request (REQ_2) may be received for service MS-2 that is configured for a retry. A third request (REQ_3) may be received for service MS-3 that is configured for a timeout. A fourth request (REQ_4) may be received for service MS-4 that is configured for circuit breaking. A fifth request (REQ_5) may be received for service MS-5 that is configured for a restart, and a sixth request (REQ_6) may be receive for service MS-6 that is configured for circuit breaking, pool ejection, and retry. As illustrated, service MS-3 did not operate correctly, such that the whole system was impacted. Similarly, in the cloud platform shown in FIG. 4, all services and requests are connected through the service mesh, so all would be impacted with an unexpected latency error. For example, requests received from the computing device 410 goes through the service mesh 430. In some cases, a request timeout, such as due to a high usage condition, will cause the resiliency controller to identify a latency response based on the requests received and the associated priorities, along with historical information. The latency response is communicated to the service mesh 430 for implementation. In an illustrative case, another line may be used to initiate another pod to perform service 3, and a retry action may be performed. As a result, the request will complete and a response may be timely returned.

FIG. 5 shows an illustrative latency control matrix according to one or more aspects of the disclosure. The latency control engine 210 may associate one or more latency control actions for different services and/or requests. For example, a retry action, a timeout action, a circuit breaking action, a restart action, a pool ejection action, and the like. In some cases, the latency control engine 210 may select an option, such as to add another pod to a service and to trigger the service mesh to initiate a retry. In another scenario, a service (e.g., MS-5) may not be fixed by adding creating a new pod. In such cases, the system may need to be taken down, such as by initiating a circuit breaking action, so that additional requests stop being received by the system. Here, the pod may be taken offline while the problem is fixed and the requests to MS-5 may be put on hold. In doing so, the other services may be saved from throttling situations. The chart in FIG. 5 show inputs and outputs to the system. For example requests are shown in the first column (e.g., App-1-Req-1), with their associated priority in the second column. A latency cause may be shown in the latency reason indicator column (e.g., slowness, service failure, unavailability, and the like). Inputs to the system are shown in the API high availability ranking column, the API SLA column, the exception reason column, the pod health indicator column, the container cpu usage indicator column, and the container resource allocated column. The resiliency controller 144 analyzes these inputs and generates a latency response action, such as retry, timeout, circuit breaking, eject pod, re-routing, restart a pod, or add a pod, and the like.

Figure 6:
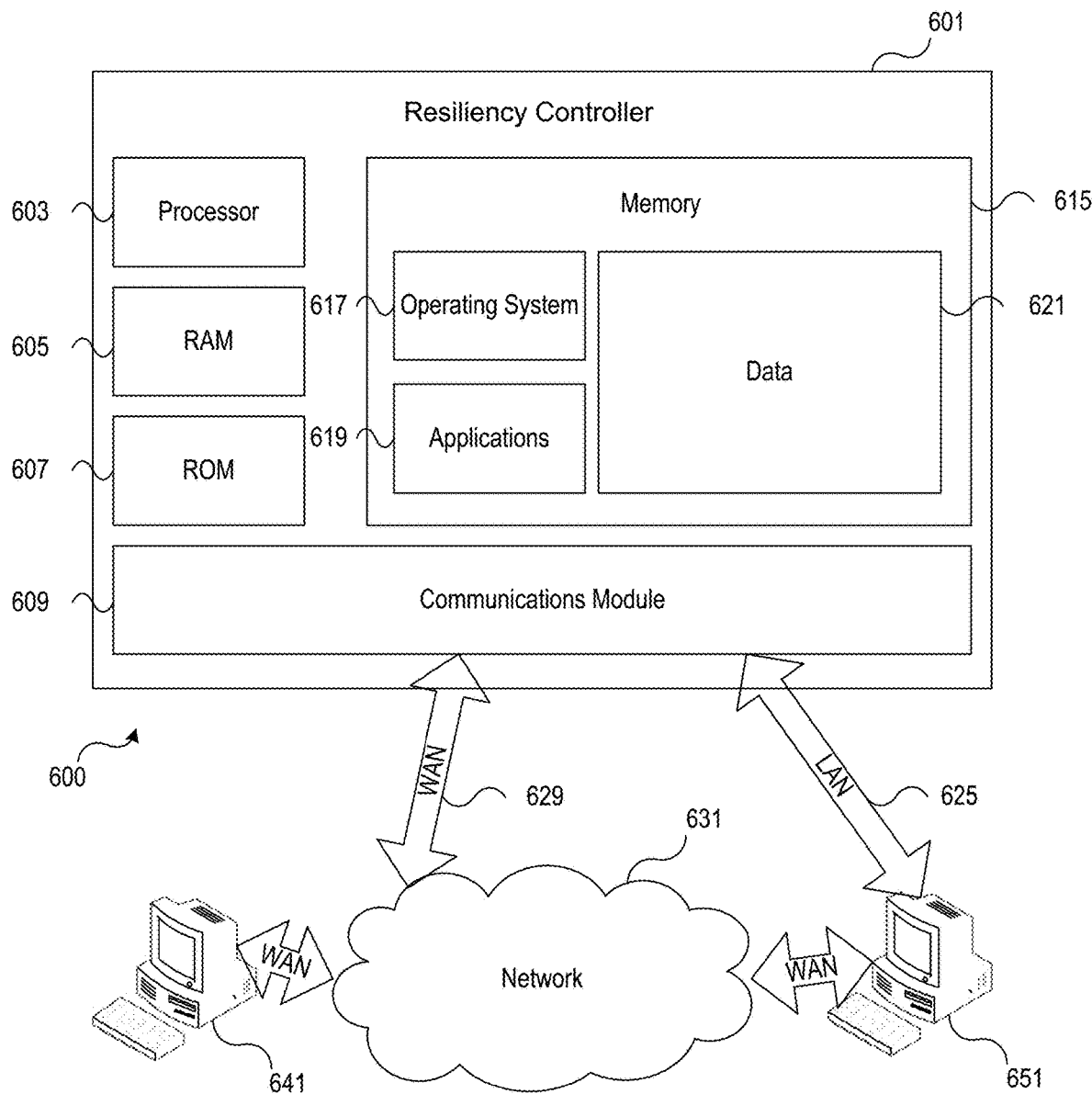
FIG. 6 shows an illustrative operating environment in which various aspects of the disclosure may be implemented according to one or more aspects of the disclosure.

FIG. 6 shows an illustrative operating environment in which various aspects of the present disclosure may be implemented in accordance with one or more example embodiments. Referring to FIG. 6, a computing system environment 600 may be used according to one or more illustrative embodiments. The computing system environment 600 is only one example of a suitable computing environment and is not intended to suggest any limitation as to the scope of use or functionality contained in the disclosure. The computing system environment 600 should not be interpreted as having any dependency or requirement relating to any one or combination of components shown in the illustrative computing system environment 600.

The computing system environment 600 may include an illustrative resiliency controller 601 having a processor 603 for controlling overall operation of the resiliency controller 601 and its associated components, including a Random Access Memory (RAM) 605, a Read-Only Memory (ROM) 607, a communications module 609, and a memory 615. The resiliency controller 601 may include a variety of computer readable media. Computer readable media may be any available media that may be accessed by the resiliency controller 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the resiliency controller 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the resiliency controller 601. Such a processor may execute computer-executable instructions stored on a computer-readable medium.

Software may be stored within the memory 315 and/or other digital storage to provide instructions to the processor 303 for enabling the resiliency controller 601 to perform various functions as discussed herein. For example, the memory 315 may store software used by the resiliency controller 601, such as an operating system 317, one or more application programs 319, and/or an associated database 321. In addition, some or all of the computer executable instructions for the resiliency controller 601 may be embodied in hardware or firmware. Although not shown, the RAM 605 may include one or more applications representing the application data stored in the RAM 605 while the resiliency controller 601 is on and corresponding software applications (e.g., software tasks) are running on the resiliency controller 601.

The communications module 609 may include a microphone, a keypad, a touch screen, and/or a stylus through which a user of the resiliency controller 601 may provide input, and may include one or more of a speaker for providing audio output and a video display device for providing textual, audiovisual and/or graphical output. The computing system environment 600 may also include optical scanners (not shown).

The resiliency controller 601 may operate in a networked environment supporting connections to one or more remote computing devices, such as the computing devices 641 and 651. The computing devices 641 and 651 may be personal computing devices or servers that include any or all of the elements described above relative to the resiliency controller 601.

The network connections depicted in FIG. 6 may include a Local Area Network (LAN) 625 and/or a Wide Area Network (WAN) 629, as well as other networks. When used in a LAN networking environment, the resiliency controller 601 may be connected to the LAN 625 through a network interface or adapter in the communications module 609. When used in a WAN networking environment, the resiliency controller 601 may include a modem in the communications module 609 or other means for establishing communications over the WAN 629, such as a network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
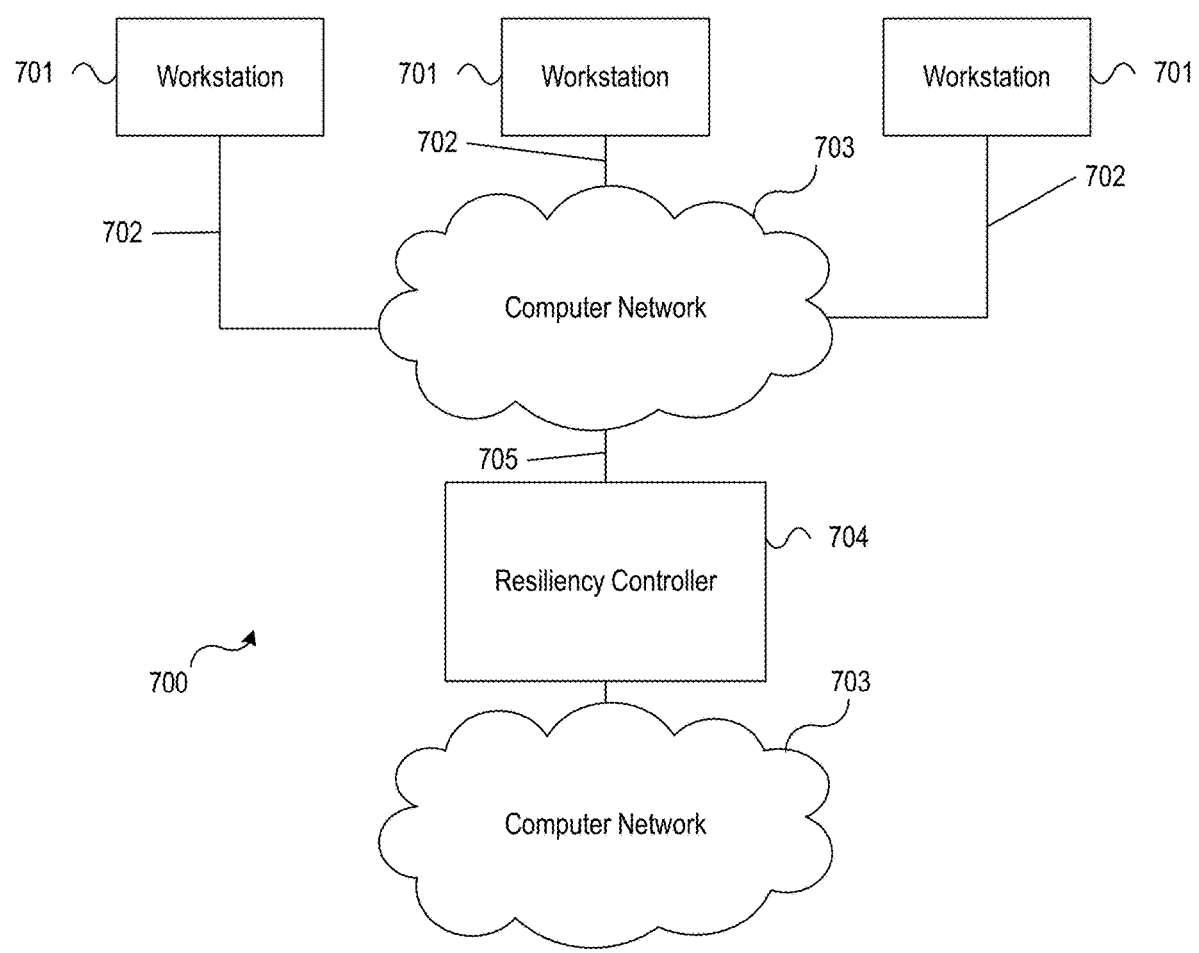
FIG. 7 shows an illustrative an illustrative block diagram of workstations and servers that may be used to implement the processes and functions of certain aspects of the present disclosure.

FIG. 7 shows an illustrative block diagram of workstations and servers that may be used to implement the processes and functions of certain aspects of the present disclosure in accordance with one or more example embodiments. For example, an illustrative system 700 may be used for implementing illustrative embodiments according to the present disclosure. As illustrated, the system 700 may include one or more workstation computers 701. The workstation 701 may be, for example, a desktop computer, a smartphone, a wireless device, a tablet computer, a laptop computer, and the like, configured to perform various processes described herein. The workstations 701 may be local or remote, and may be connected by one of the communications links 702 to a computer network 703 that is linked via the communications link 705 to the resiliency controller 704. In the system 700, the resiliency controller 704 may be a server, processor, computer, or data processing device, or combination of the same, configured to perform the functions and/or processes described herein. The resiliency controller 704 may be used to receive check images and associated data and/or validation scores, retrieve user profile, evaluate the check image compared to the user profile, identify matching or non-matching elements, generate user interfaces, and the like.

The computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 702 and 705 may be communications links suitable for communicating between the workstations 701 and the resiliency controller 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system comprising:
a plurality of client computing systems;
a containerized computing system communicatively coupled to the plurality of client computing systems via a network and comprising:
at least one processor; and
memory storing instructions that, when executed by the at least one processor, cause the containerized computing system to:
receive, via the network, a request message from a first client computing system of the plurality of computing systems;
predict, based on a message priority of the request message and system latency information, a predicted cause of latency associated with execution of the request message by a target service and an associated latency response action;
determine, by a resiliency control engine processing a regressor algorithm and a weighted combination of inputs, a latency control action to be performed in response to a latency condition, wherein the inputs comprise the predicted cause of latency, a client priority parameter, and an availability parameter; and
initiate execution of the request message by the target service.

2. The system of claim 1, wherein the instructions, when executed by the at least one processor, cause the containerized computing system to:
analyze processor loading information associated with a computing device executing the target service, wherein prediction of the cause of latency is based on current processor loading information and historical processor loading information.

3. The system of claim 1, wherein a prediction of a latency associated with a request message comprises analysis of a time to perform historical requests.

4. The system of claim 1, wherein the instructions, when executed by the at least one processor, cause the containerized computing system to:
monitor execution of requests received from the plurality of client computing systems;
analyze a performance of a container associated with execution of the target service; and
analyze resource use associated with execution of the target service.

5. The system of claim 1, wherein the instructions, when executed by the at least one processor, cause the containerized computing system to:
receive a second request message from a second client computing system;
predict, based on a message priority of the second request message and system latency information, a latency associated with execution of the second request message by a second target service and an associated second latency response action; and
associate a first latency response action to execution of the target service and the second latency response action to the second target service.

6. The system of claim 1, wherein the latency response action comprises one of a restart action, a circuit breaking action, and a retry action.

7. The system of claim 1, wherein the instructions, when executed by the at least one processor, cause the containerized computing system to:
receive, via the network, a third request message from a first client computing system of the plurality of computing systems;
predict, based on a message priority of the third request message and system latency information, a third latency associated with execution of the third request message by the target service;
associate a third dynamic latency response action to execution of the third request message by the target service; and
monitor execution of the third request message by the target service; and
initiate the third latency response based on an indication of an associated latency condition.

8. A method comprising:
monitor execution of a plurality of services, each service of the plurality of services associated with a different container of a containerized computing system;
receive a first request from a first client computing system and a second request from a second client computing system;
predict, based on historical container operation information, a first predicted cause of latency associated with the first request and a second predicted cause of latency associated with the second request;
determine, by a resiliency control engine processing a regressor algorithm and a weighted combination of inputs, a first latency control action and a second latency control action to be performed in response to a latency condition, wherein the inputs comprise the first predicted cause of latency, the second predicted cause of latency, a client priority parameter, and an availability parameter; and
associate the first latency control action to the first request and the second latency control action to the second request; and
initiate, by a latency control engine, a latency response based on an indication that at least one of a first predicted latency or a second predicted latency has been exceeded.

9. The method of claim 8, comprising:
analyze, by a latency prediction engine, loading associated with each service of the plurality of services;
analyze, via a network, a plurality of data logs associated with each service of the plurality of services, wherein prediction of the first predicted cause of latency and the second predicted cause of latency are based on analyzed loading information and analyzed data log information.

10. The method of claim 8, comprising:
based on the first request and the first predicted cause of latency, determine a first latency response; and
based on the second request and the second predicted cause of latency, determine a second latency response.

11. The method of claim 8, comprising:
determine a first latency response based on analysis of operation of the plurality of services in the containerized computing system.

12. The method of claim 8, comprising:
determine a first latency response based on analysis of operation of the containerized computing system hardware.

13. An apparatus comprising:
at least one processor; and
memory storing instructions that, when executed by the at least one processor, cause the apparatus to:
receive, via a network, a request message from a first client computing system of a plurality of computing systems;
predict, based on a message priority of the request message and system latency information, a predicted cause of latency associated with execution of the request message by a target service and an associated latency response action;
determine, by a resiliency control engine processing a regressor algorithm with a weighted combination of inputs, a latency control action to be performed in response to a latency condition, wherein the inputs comprise the predicted cause of latency, a client priority parameter, and an availability parameter; and
initiate execution of the request message by the target service.

14. The apparatus of claim 13, wherein the instructions, when executed by the at least one processor, cause the apparatus to:
analyze processor loading information associated with a computing device executing the target service, wherein prediction of the cause of latency is based on current processor loading information and historical processor loading information.

15. The apparatus of claim 13, wherein a prediction of a latency associated with a request message comprises analysis of a time to perform historical requests.

16. The apparatus of claim 13, wherein the instructions, when executed by the at least one processor, cause the apparatus to:
monitor execution of requests received from the plurality of client computing systems;
analyze a performance of a container associated with execution of the target service; and
analyze resource use associated with execution of the target service.

17. The apparatus of claim 13, wherein the instructions, when executed by the at least one processor, cause the apparatus to:
receive a second request message from a second client computing system;
predict, based on a message priority of the second request message and system latency information, a latency associated with execution of the second request message by a second target service and an associated second latency response action; and
associate a first latency response action to execution of the target service and a second latency response action to the second target service.

18. The apparatus of claim 13, wherein a first latency response action comprises one of a restart action, a circuit breaking action, and a retry action.

19. The apparatus of claim 13, wherein the instructions, when executed by the at least one processor, cause the apparatus to:
receive, via the network, a third request message from a first client computing system of the plurality of computing systems;
predict, based on a message priority of the third request message and system latency information, a third latency associated with execution of the third request message by the target service;
associate a third dynamic latency response action to execution of the third request message by the target service; and
monitor execution of the third request message by the target service; and
initiate the third latency response based on an indication of an associated latency condition.

* * * * *